Patented Dec. 17, 1946

2,412,767

UNITED STATES PATENT OFFICE 2,412,767

PROCESS FOR PREPARING MORDANT TRIAZOL DYESTUFFS

Achille Conzetti, Basel, and Otto Schmid, Muttenz, near Basel, Switzerland, assignors to J. R. Geigy A. G., Basel, Switzerland No Drawing. Original application October 20, 1941, Serial No. 415,822. Divided and this application June 29, 1944, Serial No. 542,822. In Switzerland November 26, 1940

4 Claims. (Cl. 260—308)

The present application is a division of applicants' prior application Ser. No. 415,822, filed on October 20, 1941 (Patent No. 2,362,988).

It is known that o-nitro azo dyestuffs can be converted into 2-aryl-1:3-arylentriazols. Alkali sulfides and zinc-ammonia water among others have become known as suitable reduction agents. Such 2-aryl-1:3-arylentriazols are colorless to weakly yellowish bodies which are not dyestuffs in the technical sense.

It has now surprisingly been found that 2-aryl-1:3-arylentriazols containing in both the aromatic nuclei each time in ortho- or peri-position to a triazol nitrogen atom still a metallisable group are converted in substance or on the fibre into colored complex compounds of a mostly yellow color by treatment with metal yielding agents, such as chromium or copper yielding agents. These complex dyestuff metal compounds are distinguished by a very good, in some cases by an excellent light-fastness.

The new 2-aryl-1:3-arylentriazols according to the present invention correspond to the formula

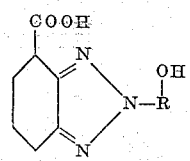

wherein R means an aromatic radical of the naphthalene series, carrying the OH group in ortho position to the azo group, dyeing wool after-chromed in yellow light-fast shades.

The above defined mordant triazol compounds are obtained by reduction of o-nitro azo dyestuffs of the general formula

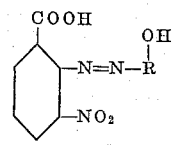

wherein R means an aromatic radical of the naphthalene series, carrying the OH group in ortho position to the azo group.

For the diazo components of the o-nitro azo dyestuffs the following o-nitro amino compounds may be used: 3-nitro-2-aminobenzoic acid, 3-nitro-2-amino-benzoic-5-sulfonic acid (obtained by sulfonating o-chlorobenzoic acid with oleum, nitrating the chlorosulfobenzoic acid with nitric acid-sulfuric acid mixture and heating the obtained 3-nitro-2-aminobenzoic-5-sulfonic acid with ammonia water in a closed vessel up to a higher temperature), 3:5-dinitro-2-aminobenzoic acid and so on. As coupling components are suitable for instance: β-naphthol, 1-hydroxy-naphthalene-4- and -5-sulfonic acid, 2-hydroxy-naphthalene-4-, -5-, -6-, -7- or -8-sulfonic acid, amino or acylaminonaphthol sulfonic acids respectively coupling in o-position to the hydroxyl group.

The reduction of the o-nitro azo dyestuffs to the corresponding triazol compounds is carried out in known manner by a treatment with alkali sulfide in an aqueous solution at a raised temperature, e. g. at 80°–100° C., or with zinc dust in ammonia water also at a raised temperature. In some cases it is advantageous for the sulfide reduction to complete the reaction by adding little quantities of stronger reduction agents, such as sodium hydrosulfide or zinc and hydrochloric acid.

When applied from an acid bath, the metal-free triazols have an excellent affinity to animal fibres and give uniform chromium dyeings of high fastness properties to light by a treatment with compounds of the 6-valent chromium. By means of coppering mostly yellow colored pigments of high fastness to light are obtained.

The products obtainable according to this method are mostly more or less yellow colored powders which, when applied from an acid bath, yield colorless or yellowish colorations on animal fibres and give, by treatment with metal yielding agents, such as for example chromium salts, strong colorations of yellow to brownish yellow dyeings. The same are distinguished by good, in some cases even by excellent fastness properties to light.

The present invention is illustrated by the following example, wherein the parts are by weight.

EXAMPLE 46.1 parts of the o-nitro dyestuff obtainable from diazotized 3-nitro-2-amino-5-sulfobenzoic acid and β-naphthol, are dissolved in 450 parts of hot water and, whilst stirring, 30 parts of an ammonium sulfide solution (corresponding to 6.8 parts $(NH_4)_2S$) dropped at 80°–90° C. into the red orange solution. Under separation of sulfur the solution becomes orange yellow colored. It is clarified and treated at 50°–60° C. with the necessary quantity of sodium hydrosulfite required for obtaining a pure yellow final color of the solution (consumption 10–12 parts of hydrosulfite). Then the whole is still maintained for 30 minutes at 60° C., acidified with 35 parts of concentrated hydrochloric acid and heated up, Already in the heat the triazol dyestuff begins to precipitate out in form of light yellow crystals. Finally the whole is treated with 50 parts of hydrochloric acid, allowed to cool down, sucked off and dried.

The dyestuff dyes wool from an acid bath with yellowish shades which by treatment with salts of hexavalent chromium change into strong reddish yellow dyeings of good fastness.

Table

| No. | o-Nitro azo dyestuff | | Treated with— | Color of the powder | Shade of wool dyeing | |
| --- | --- | --- | --- | --- | --- | --- |
| | | | | | Acid | Chromed |
| 1 | 3-nitro-2-amino-benzoic acid | → 1-hydroxynaphthalene-4-sulfonic acid | (NH$_4$)$_2$S | Yellow | Yellowish | Reddish-yellow. |
| 2 | 3-nitro-2-amino-benzoic acid | → 1-hydroxynaphthalene-5-sulfonic acid | do | do | do | Do. |
| 3 | 3-nitro-2-amino-benzoic acid | → 2-hydroxynaphthalene-4-sulfonic acid | do | do | do | Do. |
| 4 | 3-nitro-2-amino-benzoic acid | → 2-hydroxynaphthalene-6-sulfonic acid | do | do | do | Do. |

3:5-dinitro-2-aminobenzoic acid yields similar dyestuffs with the coupling components cited in the dyestuffs Nos. 1 to 4 of the foregoing table, also when in the above dyestuffs the 2-hydroxynaphthalene-4- and -6-sulfonic acid is replaced by the corresponding -5-, -7- and -8-sulfonic acid.

What we claim is:

1. Process for the manufacture of mordant dyestuffs of the 2-aryl-1:3-arylentriazol series, comprising reducing an o-nitro azo dyestuff containing a sulfonic acid group and corresponding to the formula

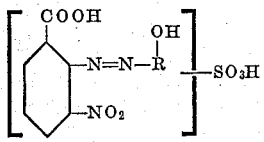

wherein R means an aromatic radical of the naphthalene series, carrying the OH group in ortho-position to the azo group.

2. Process for the manufacture of a mordant dyestuff of the 2-aryl-1:3-arylentriazol series, comprising reducing an o-nitroazo dyestuff containing a sulfonic acid group and corresponding to the formula

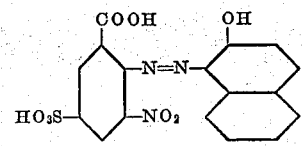

3. Process for the manufacture of mordant dyestuffs of the 2-aryl-1:3-arylentriazol series, comprising reducing an o-nitro azo dyestuff containing a sulfonic acid group and corresponding to the formula 4. Process for the manufacture of a mordant dyestuff of the 2-aryl-1:3-arylentriazol series comprising reducing an o-nitroazo dyestuff containing a sulfonic acid group and corresponding to the formula

ACHILLE CONZETTI.
OTTO SCHMID.